United States Patent [19]

Turner

[11] Patent Number: 5,060,258

[45] Date of Patent: Oct. 22, 1991

[54] CALL TRAFFIC CONTROL

[75] Inventor: Peter M. D. Turner, Colchester, England

[73] Assignee: British Telecommunications public limited company, Great Britain

[21] Appl. No.: 543,755

[22] PCT Filed: Mar. 21, 1989

[86] PCT No.: PCT/GB89/00302

§ 371 Date: Jul. 10, 1990

§ 102(e) Date: Jul. 10, 1990

[87] PCT Pub. No.: WO89/09525

PCT Pub. Date: Oct. 5, 1989

[30] Foreign Application Priority Data

Mar. 21, 1988 [GB] United Kingdom ............... 8806625

[51] Int. Cl.⁵ .......................................... H04M 15/02
[52] U.S. Cl. .................................... 379/134; 379/113; 379/137; 379/196
[58] Field of Search ............... 379/134, 137, 113, 112, 379/258, 196

[56] References Cited

U.S. PATENT DOCUMENTS 4,224,479 9/1980 Crawford ........................... 379/134
4,907,256 3/1990 Higuchi et al. ..................... 379/137

Primary Examiner—Stafford D. Schreyer
Attorney, Agent, or Firm—Nixon & Vanderhye

[57] ABSTRACT

There are disclosed a method of call control (gapping) and a communications switching system in which such method is implemented, the system incorporating a call gapping arrangement for limiting the recurrence rate of successive call attempts for a particular type of call, for example to a national phone-in number, the arrangement comprising a clock (10) for determining a succession of call gapping intervals; a first up/down counter (18) having a limit N; a signal generator (11) responsive to the clock and coupled to the counter (18) to increment it by a value m each interval; a second up/down counter (21) having a limit M less than N, the counters (18, 21) being responsive to call processing circuitry (14) to be decremented for each call attempt effected by the system: a comparator (15) responsive to the content of counter (21) becoming zero to inhibit the call processing circuitry (14) from allowing call attempts. The performance of the call gapping method is nearly ideal, and it can be left permanently operational.

12 Claims, 3 Drawing Sheets

CALL TRAFFIC CONTROL

FIELD OF THE INVENTION

This invention relates to call traffic control in a communications switching system and particularly but not exclusively to controlling call traffic to a particular called customer code.

BACKGROUND OF THE INVENTION

It is known to limit the rate at which successive attempts may be made to complete all or a part of a call to a particular called customer, and a method is disclosed in U.S. Pat. No. 4,224,479 (Kenneth E. Crawford) in which a subsequent attempt is prohibited within a predetermined time interval (gapping interval) from the last earlier allowed attempt.

Crawford's method results in a carried rate approaching one call per gapping interval only for very high offered calling rate of the order of 20 calls per gapping interval. Moreover, at offered calling rates of the order of one call per gapping interval, Crawford's method results in a significantly reduced carried rate even though the switching system can handle calls at such offered rates. Consequently, to avoid significant loss of revenue it is necessary to remove the call control or change the gapping interval when the offered calling rate drops, and such a decision is usually taken by a traffic control manager.

SUMMARY OF THE INVENTION

The present invention seeks to provide a method of controlling call traffic which is closer to ideal performance and a communications switching system in which call traffic is controlled in accordance with such method.

In accordance with a first aspect of the present invention there is provided a method of controlling call traffic in a communications switching system wherein the recurrence rate of successive attempts for a particular type of call is limited, characterised by setting a predetermined allowance of call attempts in each of a succession of equal time intervals, and by carrying forward unused allowance cumulatively.

In accordance with a second aspect of the present invention there is provided a communications switching system comprising means for limiting the recurrence rate of successive attempts for a particular type of call, characterised by clock means for establishing a succession of equal time intervals; a first accumulating means; presettable signal generating means responsive to the clock means and arranged to send to the first accumulating means each time interval a preset signal representative of the average number of call attempts per interval that are to be allowed; a second accumulating means for accumulating the number of call attempts that are effected by the system; decision means responsive to the contents of the first and second accumulating means to allow a call attempt only while the content of the second accumulating means is less than that of the first accumulating means.

In accordance with a third aspect of the present invention there is provided a call traffic control subsystem for use in a communications switching system comprising means for limiting the recurrence rate of successive attempts for a particular type of call, the subsystem being characterised by clock means for establishing a succession of equal time intervals; a first accumulating means; presettable signal generating means responsive to the clock means and arranged to send to the first accumulating means each time interval a preset signal representative of the average number of call attempts per interval that are to be allowed; a second accumulating means for accumulating the number of call attempts that are effected by the system; decision means responsive to the contents of the first and second accumulating means to allow a call attempt only while the content of the second accumulating means is less than that of the first accumulating means.

BRIEF DESCRIPTION OF THE DRAWINGS

The present invention will now be described by way of example with reference to the drawings in which.

DETAILED DESCRIPTION OF THE DRAWINGS

Figure 1:
FIG. 1 is a schematic representation of call gapping in accordance with a prior art method.

FIG. 1 represents call control or call gapping in accordance with the method (also known as algorithm) disclosed in the aforementioned U.S. patent (Crawford). Upon acceptance of a first call 1 to a particular called customer for example a phone-in number such as used for Telethons, the system prevents any further call attempts to that customer for a predetermined interval T. After the end of the interval T further call attempts will be accepted, and a second call 2 is shown a little after the first interval T, and a third call 3 is shown some time after the second interval T.

A detailed description of Crawford's method will not be given here and the reader is referred to the U.S. patent. For the purposes of the present invention it is sufficient to state that comparison is made of current time and the value of the time of last call acceptance increased by the predetermined time T.

On the assumption that call arrivals form a Poisson Process then the mean time to the next arrival from any time instant is equal to the mean interarrival time. Letting $\lambda$ be the offered calling rate (in calls per second)

T be the gapping interval (in seconds)

R be the resulting calling rate (in calls per second)

then the mean resulting interarrival time $= T + 1/\lambda$. This is equivalent to a mean resulting calling rate of $$R = \frac{1}{T + 1/\lambda} = \frac{\lambda}{\lambda T + 1} \text{ calls per second}$$

Figure 2:
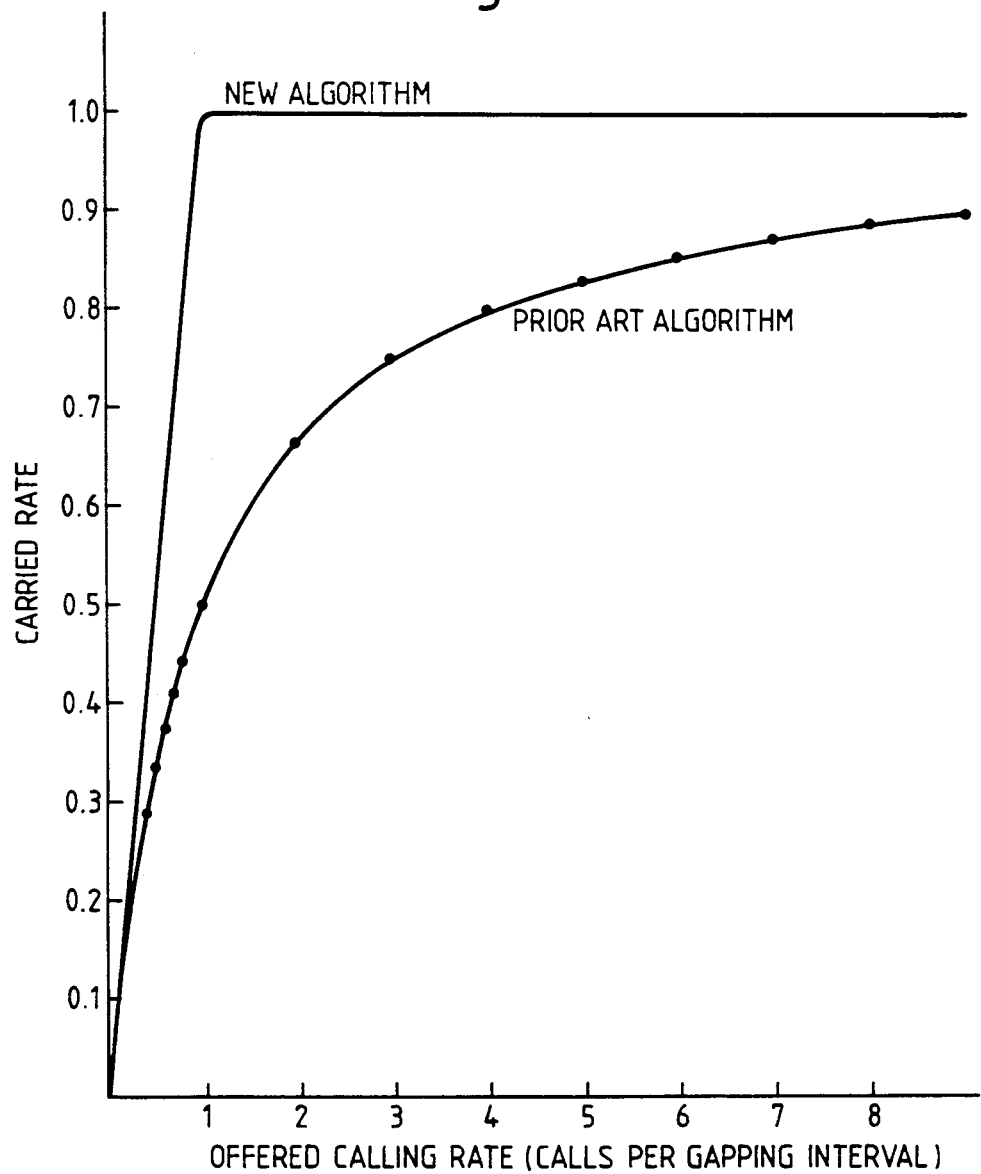
FIG. 2 is a graph of carried call rate against offered calling rate for the prior art method and for a method of the present invention.

This is shown as the prior art algorithm in FIG. 2, where it can be seen that the resulting calling rate (carried rate) is close to one call per gapping interval only at quite high calling rates in excess of ten calls per gapping interval. It would not be suitable to use such an algorithm at low calling rates because of the significant reduction in carried traffic.

Ideally a switching system should be allowed to carry all offered traffic up to a preset value of say one call per gapping interval and be limited to a carried rate of this value for all offered traffic above this. An advantage of such an algorithm is that there is no unnecessary reduction in carried traffic, and consequently the algorithm can be left operative at all times.

Figure 3:
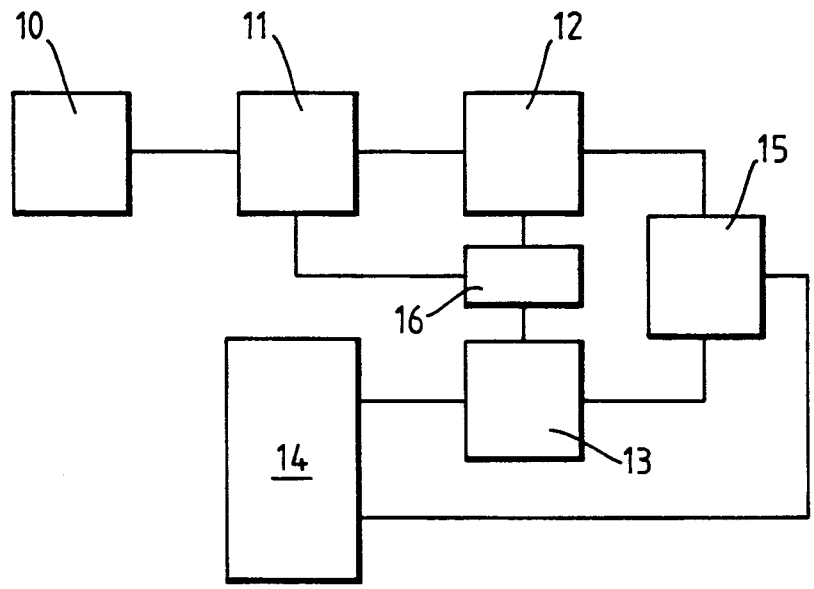
FIG. 3 is a block diagram of part of a communications switching system embodying a basic call traffic control arrangement of the present invention.

FIG. 3 shows part of a communications switching system embodying the present invention in its broader aspect. A clock pulse generator 10 is arranged to provide pulses at a repetition rate in accordance with the selected gapping interval. These pulses are received by a setting circuit 11 (constituting a presettable signal generating means of the present invention), which in turn is coupled to an accumulator 12 (constituting a first accumulating means of the present invention). The setting circuit 11 increments the accumulator 12 by a presettable value, m, at the start of each gapping interval.

A similar accumulator 13 (constituting a second accumulating means of the present invention) is coupled to call processing circuitry 14 of the system, and to a comparator 15 (constituting a decision means of the present invention) which is coupled to both accumulators 12 and 13 and to the call processing circuitry 14. A call attempt will be permitted provided that value of the contents of accumulator 13 is less than the value of the contents of accumulator 12. When sufficient call attempts have been made so that the contents of accumulator 13 become equal to the current value of the contents of the accumulator 12, then the comparator 15 changes the signal supplied to the call processing circuitry 14 to inhibit any further call attempts being processed (until the start of the next interval whereupon accumulator 12 will be incremented by m and the comparator will change back again).

An overload correction circuit 16 is coupled to both accumlators 12, 13 and to the setting circuit 11. Circuit 16 senses when accumulator 12 has reached the limit of its capacity and substracts from both accumulators 12, 13 the value of the contents of accumulator 13. Additionally or alternatively, circuit 16 performs this subtraction at the end of each interval or of a number of intervals whereby accumulator 12 gradually accumulates the value of underused allowance. If the amount of underused allowance reaches the limit of accumulator 12, the number stored will remain at the maximum value i.e. accumulator 12 does not overflow and go back to zero contents. In such a system, the size of accumlator 12 determines the maximum number of call attempts that can be made. To change this maximum, either accumulators 12, 13 can be replaced by different sized accumulators, or they can have a large capacity and be controlled by means (not shown) to define a count limit.

Figure 4:
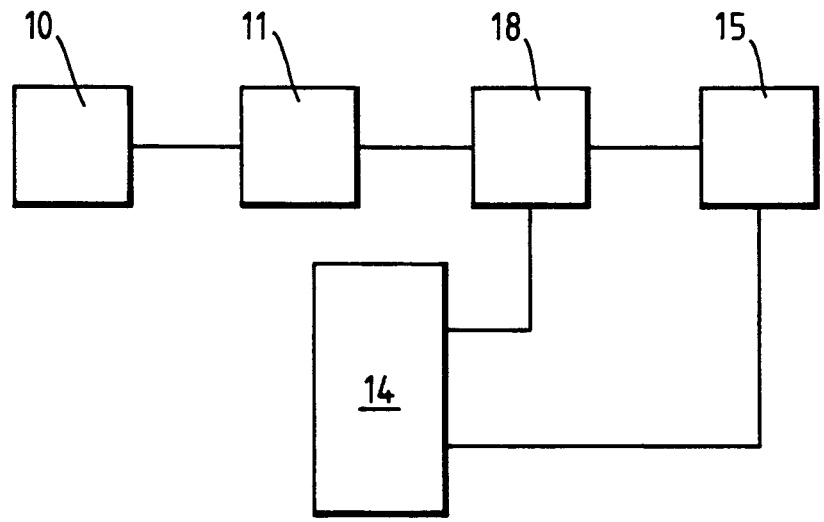
FIG. 4 is a block diagram of an alternative arrangement to that of FIG. 3.

FIG. 4 shows a variation of FIG. 3 in accordance with a preferred form of the present invention in which accumulators 12 and 13 are replaced by an up/down counter 18 (constituting a single accumulating means of the present invention) which is incremented by m at the start of each interval as determined by the setting circuit 11, and decremented by one for each call attempt permitted by the call processing circuitry 14. The comparator 15 is arranged to inhibit further call attempts while the content of counter 18 is zero. As in the FIG. 3 system, the size of counter 18 (inherent or imposed) determines the maximum number of call attempts that can be made in an interval.

Figure 5:
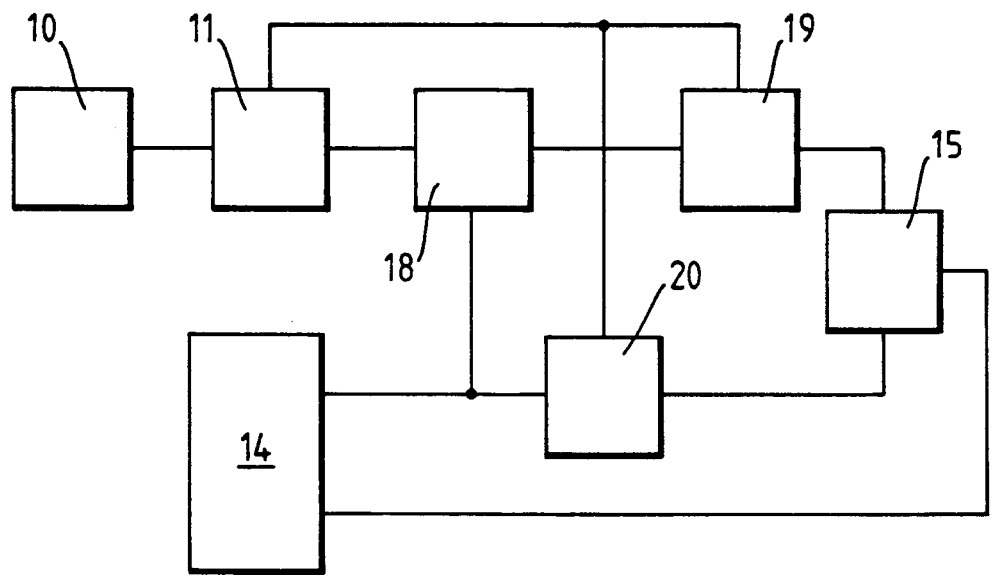
FIG. 5 is a block diagram of a preferred modification of the arrangement of FIG. 4.

FIG. 5 shows a modification of FIG. 4 in accordance with a preferred form of the present invention in which a store 19 is connected to counter 18 and to the setting circuit 11 and arranged to load the current value of the counter 18 at the start of each interval. An accumulator 20 (constituting a third accumulating means of the present invention) accumulates the number of call attempts that are effected by the system and is coupled to the setting circuit 11 and arranged to be reset at the start of each interval. The comparator 15 is responsive to the contents of store 19 and accumulator 20 and is arranged to allow further call attempts only while the count in accumulator 20 is less than the value in store 19. Counter 18 is incremented and decremented in the same manner as in the system of FIG. 4.

Figure 6:
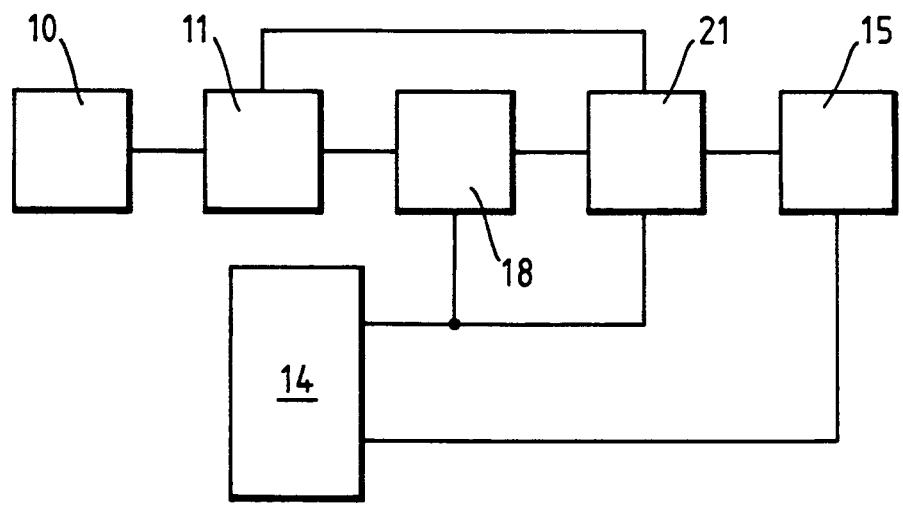
FIG. 6 is a block diagram of an alternative arrangement to that of FIG. 5.

FIG. 6 shows an alternative arrangement to the modification of FIG. 5 in which a second up/down counter 21 (constituting a another single accumulating means of the present invention) is also coupled to the call processing means 14 to be decremented by one for each call attempt permitted, and the comparator 15 is responsive to the content of counter 21 becoming zero to inhibit further call attempts by the call processing circuitry 14.

Counter 21 is coupled to counter 18 to receive a signal representative of the value of the contents (count) of counter 18; and it is also coupled to setting circuit 11 to receive a signal representative of the start of an interval, in response to which counter 21 loads the value of counter 18 up to a limit M which is less than the limit N of counter 18. Setting circuit 11 will command counter 18 to increment by m before commanding counter 21 to load the current value of counter 18.

It will be appreciated that the call gapping control arrangements shown in FIGS. 3 to 6 may be embodied in a stored program control (SPC) exchange wherein the functions, e.g. clock generation, counting, decision, are provided by suitable software.

As has been described above a preferred form of the basic algorithm of the present invention comprises (FIG. 4) establishing by means of a clock or suitable timing device, consecutive, equal gapping intervals; incrementing counter 18 by value m (one in the simplest case) at the end of each interval up to a limit of N; decrementing the counter by one for each call attempt allowed unless the counter contains zero whereupon call attempts are prevented. Thus any underuse in one gapping interval is carried forward to the next interval and so on. To prevent an unacceptably high number of calls being accepted in one gapping interval after a number of intervals of no traffic the counter has a preset limit of N, so that there cannot possibly be more than N accepted calls in a gapping interval. The preset limit of N may be achieved by the natural counting limit of the counter, or by any suitable means of limiting the counting capacity of the counter.

In a preferred algorithm of the invention, embodied in the system of FIG. 6, it is desired to avoid a peak of N accepted calls in one gapping interval yet still to obtain the same mean rate of carried calls. Thus the counter 18 with a limit of N is retained, and a further counter 21 is provided having a limit of M where $m < M < N$. So instead of a single burst of N calls there would for example be two intervals of M calls, for $M = N/2$.

In this preferred algorithm a call is prevented (lost) if the second counter 21 is zero, but carried if it is greater than zero, in which case both counters are decremented by one.

At the beginning of each gapping interval the following assignments are made counter 18=counter 18+m
counter 18=Min (counter 18, N)
counter 21=Min (counter 18, M)

In other words counter 18 is limited to N, and counter 21 follows counter 18 but is itself limited to M.

A mathematical analysis of the basic algorithm will now be given.

Let, m ... Size of counter increment.
N ... Maximum size for the counter.
R ... Offered calling rate per interval.
R' ... Resulting calling rate per interval.
$C_n$... Probability that counter contains the number n at the start of an interval (after incrementation).
$P_n$... Probability of n arrivals in an interval.
$Q_n$... Probability of n or more arrivals in an interval.

Thus $$Q_n = \sum_{i=n}^{\infty} P_i = 1 - \sum_{i=0}^{n-1} P_i$$

Note also that $C_0=0$. It can be assumed that arrivals form a Poisson Process with rate R above. This gives $$P_n = R^n * e^{-R}/n! \qquad [1]$$

Assuming that the system is in equilibrium then the following equations can be derived for the case m=1.

$$C_n = \sum_{i=n-1}^{N} C_i * P_{i-n+1} \qquad [2a]$$
$$\text{for } n = 2, 3, \ldots, N - 1$$

$$C_N = C_{N-1} * P_0 + (P_0 + P_1) * C_N \qquad [2b]$$

$$C_1 = \sum_{i=1}^{N} Q_1 * C_i \qquad [2c]$$

and the normalising equation, $$1 = \sum_{n=1}^{N} C_n \qquad [3]$$

Since [2] is a set of n linear equations in the n values C with no constant terms there is a redundant equation.

For programming purposes it is convenient to rearrange the equations in [2a] as follows, $$C_n = C_{n-1} * P_0 + P_1 * C_n + \sum_{i=n+1}^{N} C_i * P_{i-n-1} \qquad [4]$$

or $$C_{n-1} + P_0 = C_n * (1 - P_1) - \sum_{i=n+1}^{N} C_i * P_{i-n-1} \qquad [5a]$$
$$\text{for } n = 2, 3, \ldots N - 1$$

and hence, $$C_{N-1} = C_N * e^R 8 (1 - P_1 - P_0) \qquad [5b]$$

The above set of equations is triangular and linear in $C_n$.

If the above equations [5a and b] and [3] are solved for $C_n$ the carried calling rate R' is given by, $$R' = \sum_{n=1}^{N} C_n \left( n * Q_n + \sum_{i=1}^{n-1} i P_i \right) \qquad [6]$$

For general m equations [2a, 2b & 2c] must be replaced with the equations below. Note also that now $C_i = 0$ for $i < m$.

$$C_n = \sum_{i=n-m}^{N} C_i * P_{i-n+m} \qquad [7a]$$
$$\text{For } n = m + 1, \ldots N - 1$$

$$C_N = \sum_{i=0}^{m} \left( C_{N-m+i} * \sum_{j=0}^{i} P_j \right) \qquad [7b]$$

$$C_m = \sum_{i=m}^{N} Q_i * C_i \qquad [7c]$$

$$1 = \sum_{n=m}^{N} C_n \qquad [8]$$

Expression 6 for R' is unchanged.

It is useful to investigate the time dependent behaviour of this algorithm. For instance, if the counter contains 1 at the beginning of the first period what are the counter state probabilities after 100 time intervals? Furthermore, it would be of interest to calculate the expected calling rate over these time intervals. The first of these problems can be solved by multiplying the original counter state vector by the appropriate power of the transition matrix. The second problem can be solved by introducing a correction term for each time period as described below. For the sake of clarity assume that m=1.

In addition to the definitions above let, $C_n(T)$ ... The probability that the counter contains n at time T.
$C(T)$ ... The vector $[C_1(T), C_2(T), \ldots C_M(T)]$
$M_{ij}$ ... The probability of a transition from state i in one time period to j in the next.
$M$ ... The transition matrix with elements $M_{ij}$
$A(T)$ ... The probability that the counter contains N at time T-1 and there is no arrival in time period T.
$R'(T)$ ... Mean carried calling rate for the first T periods.

Then, $$C(T+1) = C(T) * M, \qquad [9a]$$

$$C(n) = C(O) * M^n, \text{ and}$$

$$A(T+1) = C_N(T) * P_0 \qquad [9b]$$

for all T.

For the sake of simplicity the following assumes that $C(O)=1$ and $C(O)=0$ for all other values of i. The counter ensures that up to the end of time T at most T calls will be carried. If the counter were allowed to grow without limit then the shortfall in calls carried in any realisation (i.e. Shortfall=T−Calls_Carried) would be given by COUNTER−1. One is subtracted to take account of the incrementation at the end of time period T.

In the limiting case the expected shortfall would be given by, $$\text{EXPECTED\_SHORTFALL} = \sum_{n=1}^{\infty} C'_n(T) * (n - 1) \quad [10]$$

Where $C'_n(T)$ is the appropriate counter state probability.

In the finite case the probability of a shortfall of a single call being unaccounted for by the counter in the time interval T is A(T).

Hence in the finite case $$\text{EXPECTED\_SHORTFALL} = \sum_{n=1}^{N} C_n(T) * (n - 1) + \sum_{t=1}^{T} A(t) \quad [11]$$

If the counter is started at a value of i ($1 < i \leq N$) then the initial value of C(O) is given by $C_i(O) = 1$ and $C_j(O) = 0$ for $i \neq j$ Equation [11] then generalises to, $$\text{EXPECTED SHORTFALL} = \sum_{n=1}^{N} C_n(T) * (n - i) + \sum_{t=1}^{T} A(t) \quad [12]$$

Then the following expression gives the expected calling rate, $$R'(T) = \frac{(T - \text{EXPECTED SHORTFALL})}{T}$$

It is a simple matter to extend this for general m by calculating a more complex correction term A(T).

When call gapping becomes implemented in the PSTN it will be possible to gap on a Route or Destination NNG (national numbering group) basis. With the previous gapping methods this would be of doubtful utility because of the danger of blocking a significant number of potentially successful calls.

The above analysis has been used to calculate performance of the algorithm and the results are now given for the simplest version of this algorithm with m=1. It can be expected that the results will be better for suitable values of m. As can be seen in FIG. 2 the algorithm comes very close to the perfect behaviour which can be characterised by, R'=R for R<1, and
R'=1 for R=1 or R>1.

The algorithm performs worst at R=1 where R'=0.985.

For the prior art algorithm the value at R=1 is R'=0.5.

Outside the range R=0.95 to 1.05 the present algorithm deviates from perfect behaviour by less than one call in a thousand.

The exact performance of the algorithm depends on the maximum counter size. This is shown in table 1. Table entries give the carried rates R'.

TABLE 1

| MAXIMUM COUNTER SIZE | OFFERED RATES | | | | |
|---|---|---|---|---|---|
| | .90 | .95 | 1.0 | 1.05 | 1.1 |
| 10 | .887 | .923 | .952 | .972 | .984 |
| 20 | .898 | .943 | .975 | .992 | .999 |
| 30 | .900 | .948 | .984 | .997 | 1.000 |
| 40 | .900 | .949 | .988 | .999 | 1.000 |

This suggests the use of a value of at least 30 for the counter maximum.

Tables 2 and 3 show how the initial value in the counter effects the performance of the algorithm in the short term. The counter maximum is fixed at 32. Table entries are the corresponding carried rates.

TABLE 2

| COUNTER INITIALISED TO 0 | OFFERED RATES | | | | |
|---|---|---|---|---|---|
| | .90 | .95 | 1.0 | 1.05 | 1.1 |
| Steady state | .8999 | .9481 | .9845 | .9978 | .9998 |
| First 100 periods | .8659 | .8995 | .9266 | .9471 | .9618 |
| First 500 periods | .8919 | .9340 | .9655 | .9831 | .9907 |
| Periods 200–500 | .8984 | .9426 | .9752 | .9921 | .9979 |

TABLE 3

| COUNTER INITIALISED TO 16 | OFFERED RATES | | | | |
|---|---|---|---|---|---|
| | .90 | .95 | 1.0 | 1.05 | 1.1 |
| Steady state | .8999 | .9481 | .9845 | .9978 | .9998 |
| First 100 periods | .8995 | .9481 | .9944 | 1.0360 | 1.0709 |
| First 500 periods | .8996 | .9472 | .9866 | 1.0103 | 1.0202 |
| Periods 200–500 | .8996 | .9470 | .9847 | 1.0039 | 1.0073 |

It will be appreciated that the above described algorithm should be simple to implement on a modern software controlled digital switching system such as System X and add little to processing overheads. The performance of the algorithm is nearly ideal thus ensuring its effectiveness in practice and simplicity in use. It can be used to control an overload focussed on individual numbers without the need for careful monitoring. Indeed its performance is good enough that it can be left on permanently.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

I claim:

1. A method of controlling call traffic in a communications switching system wherein the recurrence rate of successive attempts for a particular type of call is limited, characterised by setting a predetermined allowance of call attempts in each of a succession of equal time intervals, and by carrying forward unused allowance cumulatively.

2. A method as claimed in claim 1 characterised by limiting the number of call attempts in an interval.

3. A method as claimed in claim 1 characterised by limiting the amount of accumulated allowance.

4. A method as claimed in claim 3 characterised by limiting the number of call attempts in an interval to a value less than the value of the limit of accumulated allowance.

5. A communications switching system comprising means for limiting the recurrence rate of successive attempts for a particular type of call, characterised by clock means for establishing a succession of equal time intervals; a first accumulating means; presettable signal generating means responsive to the clock means and arranged to send to the first accumulating means each time interval a preset signal representative of the average number of call attempts per interval that are to be allowed; a second accumulating means for accumulating the number of call attempts that are effected by the system; decision means responsive to the contents of the first and second accumulating means to allow a call attempt only while the content of the second accumulating means is less than that of the first accumulating means.

6. A system as claimed in claim 5 characterised in that said first and said second accumulating means are together constituted by a single accumulating means which is incremented by said preset signal and decremented in response to call attempts effected by the system; and said decision means allows a call attempt only while the content of said single accumulating means is greater than zero.

7. A communications switching system comprising means for limiting the recurrence rate of successive attempts for a particular type of call, characterised by clock means for establishing a succession of equal time intervals; a single accumulating means; presettable signal generating means responsive to the clock means and arranged to send to the single accumulating means each time interval a preset signal representative of the average number of call attempts per interval that are to be allowed; said single accumulating means being arranged to be incremented by said preset signal and decremented in response to call attempts effected by the system; a storing means for storing the number of call attempts that are allowed in any one interval, said storing means having a capacity less than that of said single accumulating means; means for presetting the storing means at the start of each interval with the current value in said single accumulating means; a further accumulating means for accumulating the number of call attempts that are effected by the system in an interval; and decision means responsive to said storing means and said further accumulating means to allow a call attempt only while the content of said further accumulating means is less than that of said storing means.

8. A system as claimed in claim 7 characterised in that said storing means and said further accumulating means are together constituted by another single accumulating means which is decremented in response to call attempts effected by the system; and said decision means allows a call attempt only while the content of said another single accumulating means is greater than zero.

9. A call traffic control subsystem for use in a communications switching system comprising means for limiting the recurrence rate of successive attempts for a particular type of call, the subsystem being characterised by clock means for establishing a succession of equal time intervals; a first accumulating means; presettable signal generating means responsive to the clock means and arranged to send to the first accumulating means each time interval a preset signal representative of the average number of call attempts per interval that are to be allowed; a second accumulating means for accumulating the number of call attempts that are effected by the system; decision means responsive to the contents of the first and second accumulating means to allow a call attempt only while the content of the second accumulating means is less than that of the first accumulating means.

10. A subsystem as claimed in claim 9 characterised in that said first and said second accumulating means are together constituted by a single accumulating means which is incremented by said preset signal and decremented in response to call attempts effected by the system; and said decision means allows a call attempt only while the content of said single accumulating means is greater than zero.

11. A call traffic control subsystem for use in a communications switching system comprising means for limiting the recurrence rate of successive attempts for a particular type of call, the subsystem being characterised by clock means for establishing a succession of equal time intervals; a single accumulating means; presettable signal generating means responsive to the clock means and arranged to send to the single accumulating means each time interval a preset signal representative of the average number of call attempts per interval that are to be allowed; said single accumulating means being arranged to be incremented by said preset signal and decremented in response to call attempts effected by the system; a storing means for storing the number of call attempts that are allowed in any one interval, said storing means having a capacity less than that of said single accumulating means; means for presetting the storing means at the start of each interval with the current value in said single accumulating means; a further accumulating means for accumulating the number of call attempts that are effected by the system in an interval; and decision means responsive to said storing means and said further accumulating means to allow a call attempt only while the content of said further accumulating means is less than that of said storing means.

12. A subsystem as claimed in claim 11 characterised in that said storing means and said further accumulating means are together constituted by another single accumulating means which is decremented in response to call attempts effected by the system; and said decision means allows a call attempt only while the content of said another single accumulating means is greater than zero.

* * * * *